United States Patent
Wang

(10) Patent No.: US 8,203,364 B2
(45) Date of Patent: Jun. 19, 2012

(54) METHOD OF TRANSMITTING AUDIO AND VIDEO SIGNALS USING ONE CONNECTOR AND ELECTRONIC DEVICE USING SAME

(75) Inventor: Ting-Yu Wang, Guangdong (CN)

(73) Assignees: Premier Image Technology(China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1006 days.

(21) Appl. No.: 12/174,637

(22) Filed: Jul. 17, 2008

(65) Prior Publication Data
US 2009/0153197 A1 Jun. 18, 2009

(30) Foreign Application Priority Data
Dec. 17, 2007 (CN) .......................... 2007 1 0203141

(51) Int. Cl.
*H03K 5/153* (2006.01)
(52) U.S. Cl. ........................... 327/74; 704/503; 704/504
(58) Field of Classification Search ..................... 327/64, 327/541
See application file for complete search history.

(56) References Cited

U.S. PATENT DOCUMENTS
6,184,745 B1 * 2/2001 Kim .............................. 327/541
2010/0289530 A1 * 11/2010 Nakajima et al. ............... 327/63

FOREIGN PATENT DOCUMENTS
CN 1567147 A 1/2005
* cited by examiner

*Primary Examiner* — Firmin Backer
*Assistant Examiner* — Keyvan Emdadi
(74) *Attorney, Agent, or Firm* — Altis Law Group, Inc.

(57) ABSTRACT

An electronic device includes a connector, at least two kinds of signal transmitting circuits, and a selecting system. The connector is capable of transmitting audio and video signals when connected to a peripheral device. The selecting system includes a detecting module, a memory module, a comparing module, and a connecting module. The detecting module is capable of detecting and measuring the voltage of a signal line of the connector. The memory module is capable of storing predetermined voltage ranges corresponding to different kinds of peripheral devices. The comparing module is capable of comparing the voltage of the signal line measured by the detecting module to the predetermined voltage ranges and determining what kind of peripheral device is connected to the connector. The connecting module is capable of connecting the connector to one of the signal transmitting circuits according to the comparing module.

14 Claims, 2 Drawing Sheets

METHOD OF TRANSMITTING AUDIO AND VIDEO SIGNALS USING ONE CONNECTOR AND ELECTRONIC DEVICE USING SAME

BACKGROUND

1. Technical Field

The present invention relates to electronic devices and, particularly, to an electronic device and a method for the electronic device transmitting audio and video signals using one connector.

2. Description of the Related Art

Electronic devices, such as music players, digital cameras, and so on, can typically receive and playback a signal from an external device. The signal lines are correspondingly connected one by one between the electronic devices and the external device. A connector of the electronic device usually can only transmit one kind of signal, for example, an audio or video signal. So, in order to transmit different kinds of signals, the electronic device usually has to have a number of connectors, which make the electronic device bulky and limit the miniaturization of possible designs.

What is needed, therefore, is an electronic device and a method for transmitting audio and video signals to overcome the above-described problem.

SUMMARY

In an exemplary embodiment, an electronic device includes a connector, at least two kinds of signal transmitting circuits, and a selecting system. The connector is capable of transmitting audio and video signals when connected to a peripheral device. The selecting system includes a detecting module, a memory module, a comparing module, and a connecting module. The detecting module is capable of detecting and measuring the voltage of a signal line of the connector. The memory module is capable of storing predetermined voltage ranges corresponding to different kinds of peripheral devices. The comparing module is capable of comparing the voltage of the signal line measured by the detecting module to the predetermined voltage ranges and determining what kind of peripheral device is connected to the connector. The connecting module is capable of connecting the connector to one of the signal transmitting circuits according to the comparing module.

BRIEF DESCRIPTION OF THE DRAWINGS

Many aspects of the present electronic device and related method can be better understood with reference to the following drawings. The components in the drawings are not necessarily drawn to scale, the emphasis instead being placed upon clearly illustrating the principles of the present electronic device and related method.

DETAILED DESCRIPTION OF THE EMBODIMENTS

Embodiments of the present invention will now be described in detail below, with reference to the accompanying drawings.

Figure 1:
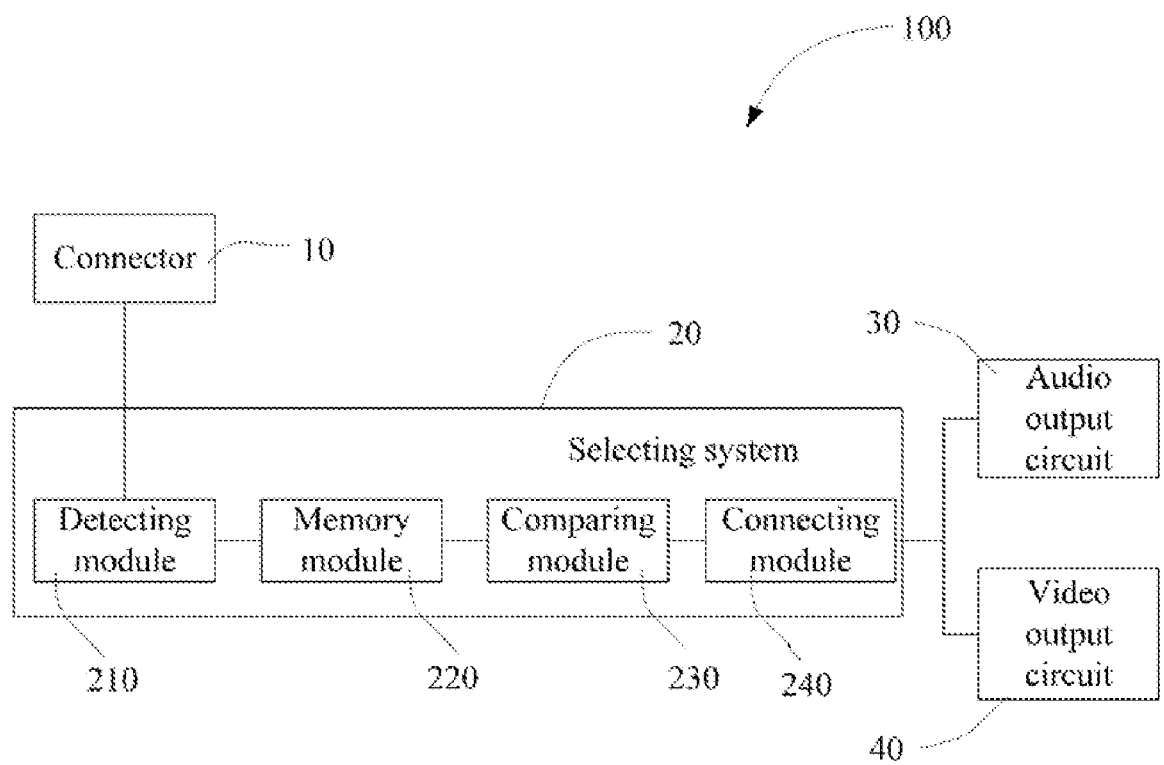
FIG. 1 is a functional block diagram of an electronic device according to an exemplary embodiment.

Referring to FIG. 1, an electronic device 100, according to an exemplary embodiment, is shown. The electronic device 100 includes a connector 10, a selecting system 20, and at least two kinds of signal transmitting circuits. The signal transmitting circuits can be selected from a group consisting of an audio output circuit, a video output circuit, a video input circuit, and an audio input circuit. In the present embodiment, the electronic device 100 includes two kinds of signal transmitting circuits, an audio output circuit 30 and a video output circuit 40.

The connector 10 is configured for communicating with a peripheral device (not shown). The peripheral device can be an audio output device, a video output device, a video input device, or an audio input device and so on. Specifically, the audio output device can be an earphone or speaker. The video output device can be a monitor or a TV. The video input device can be a digital camera. The audio input device can be a microphone.

The selecting system 20 is electrically coupled to the connector 10, and is configured for connecting a signal transmitting circuit of the electronic device to the connector 10 according to the kind of the peripheral device. In the present embodiment, the selecting system 20 can connect the audio output circuit 30 or the video output circuit 40 to the connector 10. The selecting system 20 includes a detecting module 210, a memory module 220, a comparing module 230, and a connecting module 240.

The detecting module 210 is electrically coupled to the connector 10 and is configured for detecting and measuring the voltage of a signal line of the connector 10. Typically, the voltage of the signal line of the connector 10 is zero, or low when the connector 10 is not connected to a peripheral device, and is high when the connector 10 is connected to a peripheral device. The value of high voltage will depends on what kind of peripheral device the connector 10 is connected to. For example, when the connector 10 is connected to an audio output device, such as an earphone or speaker, the voltage of the signal line of the connector 10 ranges from 0.4V to 1.2V; and when the connector 10 is connected to a video output device, such as a monitor or a TV, the voltage of the signal line of the connector 10 ranges from 1.2V to 4.0V.

The memory module 220 is electrically coupled to the detecting module 210 and is configured for storing predetermined voltage ranges corresponding to different kinds of peripheral devices. In the present embodiment, the predetermined voltage range corresponding to audio output devices is from 0.4V to 1.2V, the predetermined voltage range corresponding to video output devices is from 1.2V to 4.0V.

The comparing module 230 is electrically coupled to the memory module 220 and is configured for comparing the voltage of the signal line of the connector 10 measured by the detecting module 210 with the voltage ranges stored in the memory module 220, and determining which kind of peripheral device is connected to the connector 10. For example, if the measured voltage of the signal line of the connector 10 is in a range from 0.4V to 1.2V, the peripheral device is determined to be an audio output device. If the measured voltage of the signal is in a range from 1.2V to 4.0V, the peripheral device is determined to be a video output device.

The connecting module 240 is electrically coupled to the comparing module 230, and is configured for connecting the connector 10 to the audio output circuit 30 or the video output circuit 40, according to the determination of the comparing module 230, for output of corresponding audio or video signals to a connected peripheral device.

Figure 2:
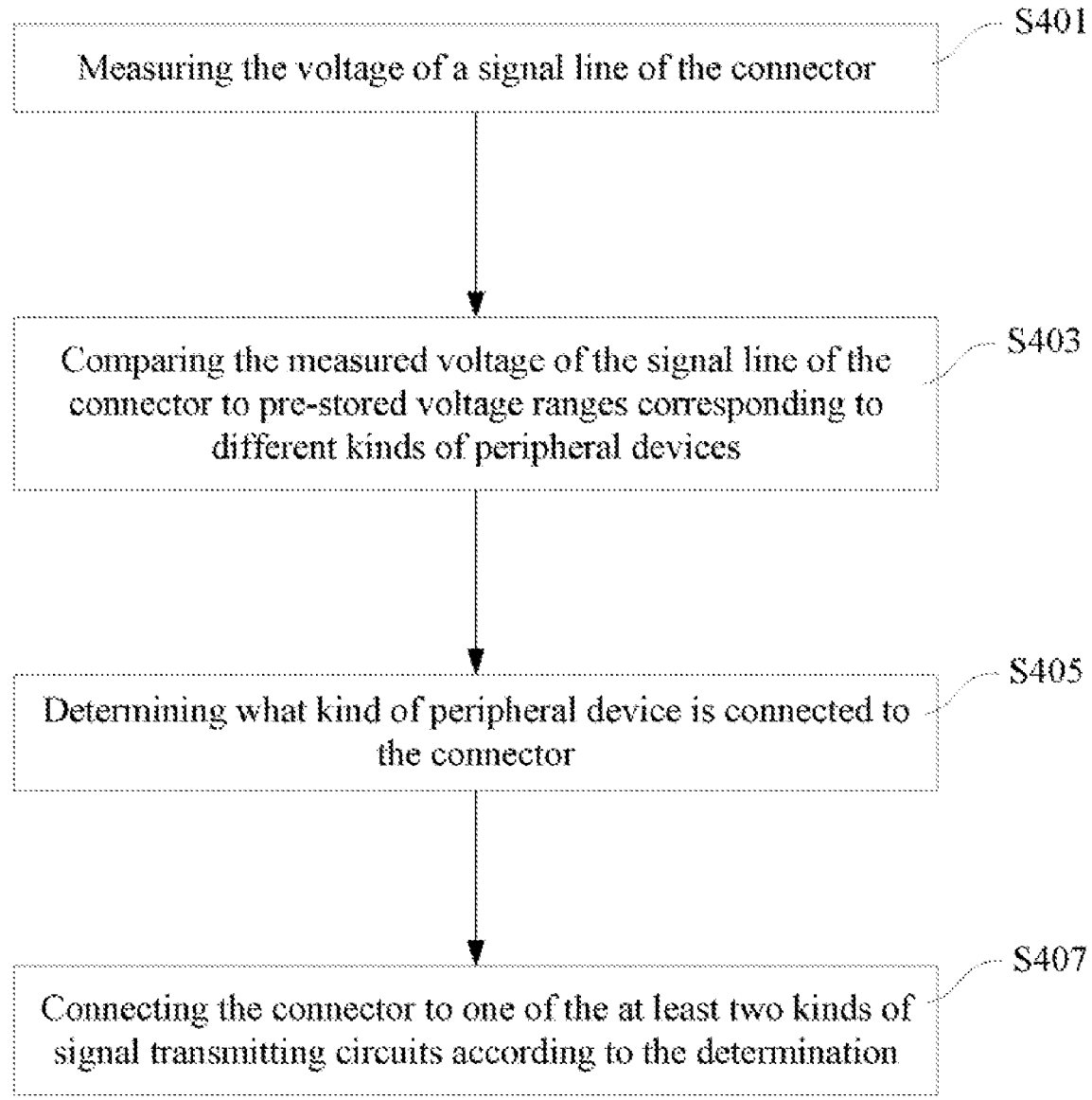
FIG. 2 is a flowchart of a method of transmitting audio and video signals using one connector for the electronic device of FIG. 1.

Referring to FIG. 2, a flowchart of a method of transmitting audio and video signals using one connector for the electronic device 100 is shown. The method includes the following steps.

Step S401, measuring voltage of a signal line of the connector 10. In the present embodiment, the detecting module 210 of the selecting system 20 performs this step.

Step S403, comparing the measured voltage of the signal line of the connector 10 to pre-stored voltage ranges corresponding to different kinds of peripheral devices. In the present embodiment, the pre-stored voltage ranges are stored in the memory module 220. The comparing module 230 is used for comparing the voltage of the signal line of the connector 10 to pre-stored voltage ranges.

Step S405, determining which kind of peripheral device is connected to the connector 10. In the present embodiment, the comparing module 230 can also be used for this step.

Step S407, connecting the connector 10 to one of the signal transmitting circuits according to the determination. In the present embodiment, the connecting module 240 is configured for connecting the connector 10 to the determined kind of signal transmitting circuit.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. An electronic device comprising:
   a connector capable of transmitting audio and video signal when connected to a peripheral device;
   at least two kinds of signal transmitting circuits; and
   a selecting system comprising:
      a detecting module capable of detecting and measuring the voltage of a signal line of the connector;
      a memory module capable of storing predetermined voltage ranges corresponding to different kinds of peripheral devices selected from an audio output device, an audio input device, a video output device, and a video input device, wherein the predetermined voltage range corresponding to the video output device is from 1.2V to 4.0V;
      a comparing module capable of comparing the voltage of the signal line measured by the detecting module to the predetermined voltage ranges and determining what kind of device is connected to the connector; and
      a connecting module capable of connecting the connector to one of the at least two kinds of signal transmitting circuits according to determination of the comparing module.

2. The electronic device as claimed in claim 1, wherein the audio output device is an earphone or a speaker.

3. The electronic device as claimed in claim 1, wherein the video output device is a monitor or a TV.

4. The electronic device as claimed in claim 1, wherein the video input device is a digital camera.

5. The electronic device as claimed in claim 1, wherein the audio input device is a microphone.

6. The electronic device as claimed in claim 1, wherein the predetermined voltage range corresponding to the audio output device is from 0.4V to 1.2V.

7. The electronic device as claimed in claim 1, wherein the at least two kinds of signal transmitting circuits are an audio output circuit and a video output circuit.

8. A method of transmitting audio and video signals with different kinds of peripheral devices using one connector for an electronic device, the electronic device having at least two kinds of signal transmitting circuits, the method comprising:
   measuring the voltage of a signal line of the connector connected to a peripheral device;
   comparing the measured voltage of the signal line of the connector to pre-stored voltage ranges corresponding to different kinds of peripheral devices selected from an audio output device, an audio input device, a video output device, and a video input device, wherein the pre-stored voltage range corresponding to the video output device is from 1.2V to 4.0V;
   determining what kind of peripheral device is connected to the connector; and
   connecting the connector to one of the at least two kinds of signal transmitting circuits according to the determination.

9. The method as claimed in claim 8, wherein the audio output device is an earphone or a speaker.

10. The method as claimed in claim 8, wherein the video output device is a monitor or a TV.

11. The method as claimed in claim 8, wherein the video input device is a digital camera.

12. The method as claimed in claim 8, wherein the audio input device is a microphone.

13. The method as claimed in claim 8, wherein the pre-stored voltage range corresponding to the audio output device is from 0.4V to 1.2V.

14. The method as claimed in claim 8, wherein the at least two kinds of signal transmitting circuits are an audio output circuit and a video output circuit.

* * * * *